(12) United States Patent
Jitkoff et al.

(10) Patent No.: US 9,110,568 B2
(45) Date of Patent: Aug. 18, 2015

(54) BROWSER TAB MANAGEMENT

(75) Inventors: John Nicholas Jitkoff, Palo Alto, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/246,646

(22) Filed: Sep. 27, 2011

(65) Prior Publication Data

US 2015/0205462 A1 Jul. 23, 2015

Related U.S. Application Data

(63) Continuation of application No. 12/903,655, filed on Oct. 13, 2010.

(60) Provisional application No. 61/251,289, filed on Oct. 13, 2009.

(51) Int. Cl.
G06F 3/048 (2013.01)
G06F 3/00 (2006.01)
G06F 3/0483 (2013.01)
G06F 17/30 (2006.01)

(52) U.S. Cl.
CPC ........ *G06F 3/0483* (2013.01); *G06F 17/30876* (2013.01)

(58) Field of Classification Search
CPC .. G06F 3/048; G06F 17/30876; G06F 3/0483
USPC .......................... 715/777, 804, 745
See application file for complete search history.

(56) References Cited

U.S. PATENT DOCUMENTS

| 6,285,999 | B1 | 9/2001 | Page | |
|---|---|---|---|---|
| 8,191,007 | B1* | 5/2012 | Veloz, III | 715/777 |
| 2003/0071842 | A1* | 4/2003 | King et al. | 345/762 |
| 2004/0205755 | A1* | 10/2004 | Lescouet et al. | 718/100 |
| 2006/0248471 | A1* | 11/2006 | Lindsay et al. | 715/800 |
| 2007/0067733 | A1* | 3/2007 | Moore et al. | 715/777 |
| 2007/0220441 | A1* | 9/2007 | Melton et al. | 715/781 |
| 2007/0239610 | A1* | 10/2007 | Lemelson | 705/51 |
| 2008/0005686 | A1* | 1/2008 | Singh | 715/764 |
| 2008/0034317 | A1* | 2/2008 | Fard et al. | 715/781 |
| 2008/0141117 | A1* | 6/2008 | King et al. | 715/238 |

(Continued)

OTHER PUBLICATIONS

Ryan, "CyberNotes: Must-Have Firefox Tab Manager", archived by the Wayback Machine on Oct. 11, 2007, retreived from http://web.archive.org/web/20071011080230/http://cybernetnews.com/2007/10/10/cybernotes-must-have-firefox-tab-manager on Apr. 24, 2012.*

(Continued)

*Primary Examiner* — Kieu Vu
*Assistant Examiner* — Aaron Lowenberger
(74) *Attorney, Agent, or Firm* — Brake Hughes Bellermann LLP

(57) ABSTRACT

Tabs of online content can be positioned according to the relative importance of each tab to a user. A user's interaction with a plurality of online content is monitored, and user activity metadata generated by, and associated with, the user's interaction with the online content is collected. A plurality of tabs of the online content is opened in a graphical user interface, and a relative importance of each of the plurality of tabs to the user is determined based on the user activity metadata associated with the online content in the tab. At least a subset of the tabs are positioned relative to each other within the graphical user interface based at least on the relative importance of each tab.

26 Claims, 7 Drawing Sheets

(56) References Cited

U.S. PATENT DOCUMENTS

| | | | |
|---|---|---|---|
| 2008/0141161 A1* | 6/2008 | Raven et al. | 715/777 |
| 2008/0172362 A1* | 7/2008 | Shacham et al. | 707/3 |
| 2009/0132516 A1* | 5/2009 | Patel et al. | 707/5 |
| 2009/0164915 A1* | 6/2009 | Gasn et al. | 715/753 |
| 2009/0303242 A1 | 12/2009 | Kraut | |
| 2009/0327913 A1* | 12/2009 | Adar et al. | 715/745 |
| 2010/0131877 A1* | 5/2010 | Dharwada et al. | 715/765 |

OTHER PUBLICATIONS

Mellor, "Tab Kit", archived by the Wayback Machine on Sep. 13, 2008, retrieved from http://web.archive.org/web/20080913133849/http://jomel.me.uk/software/firefox/tabkit/ on Apr. 13, 2012.*

Non-Final Office Action for U.S. Appl. No. 12/903,655, mailed Oct. 12, 2012, 63 pages.

Mellor, "Tab Kit", archived by the Wayback Machine on Sep. 13, 2008, retrieved from http://web.arch ive.org/web/20080913133849/ http :/ /jomel. me.uk!software/firefox/tabkit! on Apr. 13, 2012, 4 pages.

Ryan, "CyberNotes: Must-Have Firefox Tab Manager", archived by the Wayback Machine on Oct. 11, 2007, retreived from http://web.archive.org/web/20071 011 080230/http:l/cybernetnews.com/ 2007/1 0/1 0/cybernotes-must-have-firefox-tab-manager on Apr. 24, 2012, 8 pages.

* cited by examiner

BROWSER TAB MANAGEMENT

CROSS REFERENCE TO RELATED APPLICATIONS

This application is a continuation of U.S. Non-Provisional patent application Ser. No. 12/903,655, filed Oct. 13, 2010, entitled, "BROWSER TAB MANAGEMENT," which in turn claims the benefit of U.S. Provisional Application No. 61/251,289, filed Oct. 13, 2009, and titled "Browser Based User Interface For Cloud Optimized Computer Platform." Both of the above-referenced applications are incorporated herein by reference in their entirety.

TECHNICAL FIELD

This document relates to methods and apparatus for displaying and manipulating information in a web browser and, in particular, to browser tab management.

BACKGROUND

With the creation of the world-wide-web and high speed computer networks, the paradigm for personal computer usage has dramatically shifted. In the past, users would primarily use their personal computers to run programs, and store and manipulate data that was located on their local hard-drive. Only rarely would users store or manipulate data located on a networked drive, or run a program that was provided as a network service, and even then, the programs and data were usually restricted to a local area network. Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program.

Due to this shift in computer usage, today's computer users are unlikely to want or need many of the bells and whistles provided by modern operating systems. They do not need to worry about file structures or organizing or backing up their data, because much of their data is stored, organized and backed up for them on the cloud. They do not need to worry about loading and updating software, because most of the software they use is provided to them when needed as a cloud-based service. Instead, today's computer users are more interested in quickly logging onto their computer, launching a web browser, and accessing data and programs of interest to them, which are accessible through the world wide web. Therefore the presentation and manipulation of information in a graphical user interface, such as a web browser, becomes an important concern.

Modern graphical user interfaces (GUIs) are based generally upon the idea of a "window." In computing, a "window" is a visual area, usually rectangular, containing some kind of user interface. Windows are often two dimensional objects arranged on a plane known as the "desktop." In a modern full-featured windowing system windows may be resized, moved, hidden, restored or closed, etc.

Windows usually include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individuals "tabs." These tabs are typically displayed one at a time, and are selectable via a tab-bar which often resides above the contents of an individual window.

Modern operating systems generally allow for the manipulation and selection of windows. A well known example is the Alt-Tab feature of Microsoft™ Windows™ systems (e.g., Windows XP™, Windows Vista™, Windows 7™, etc.), which allows a user to flip through active windows via the Alt-Tab keyboard shortcut. Alternatively, the Macintosh™ OS X™ system employs a window manager tool called "Expose™" which tiles thumbnails or miniature versions of the windows within the display, allowing a user to select a window to move to the foreground.

SUMMARY

This document describes systems and techniques to manage and display information in a user interface.

In a general aspect, a computer implemented method, technique and apparatus are provided for positioning tabs of online content according to the relative importance of each tab to a user. A user's interaction with a plurality of online content is monitored, and user activity metadata generated by, and associated with, the user's interaction with the online content is collected. A plurality of tabs of the online content is opened in a graphical user interface, and a relative importance of each of the plurality of tabs to the user is determined based on the user activity metadata associated with the online content in the tab. At least a subset of the tabs are positioned relative to each other within the graphical user interface based at least on the relative importance of each tab.

In another general aspect, a plurality of tabs of online content are opened in a graphical user interface, and relations between the online content of the different opened tabs are determined. At least a subset of the tabs are positioned relative to each other within the graphical user interface based at least on the relations between the tabs.

DETAILED DESCRIPTION

Figure 1:
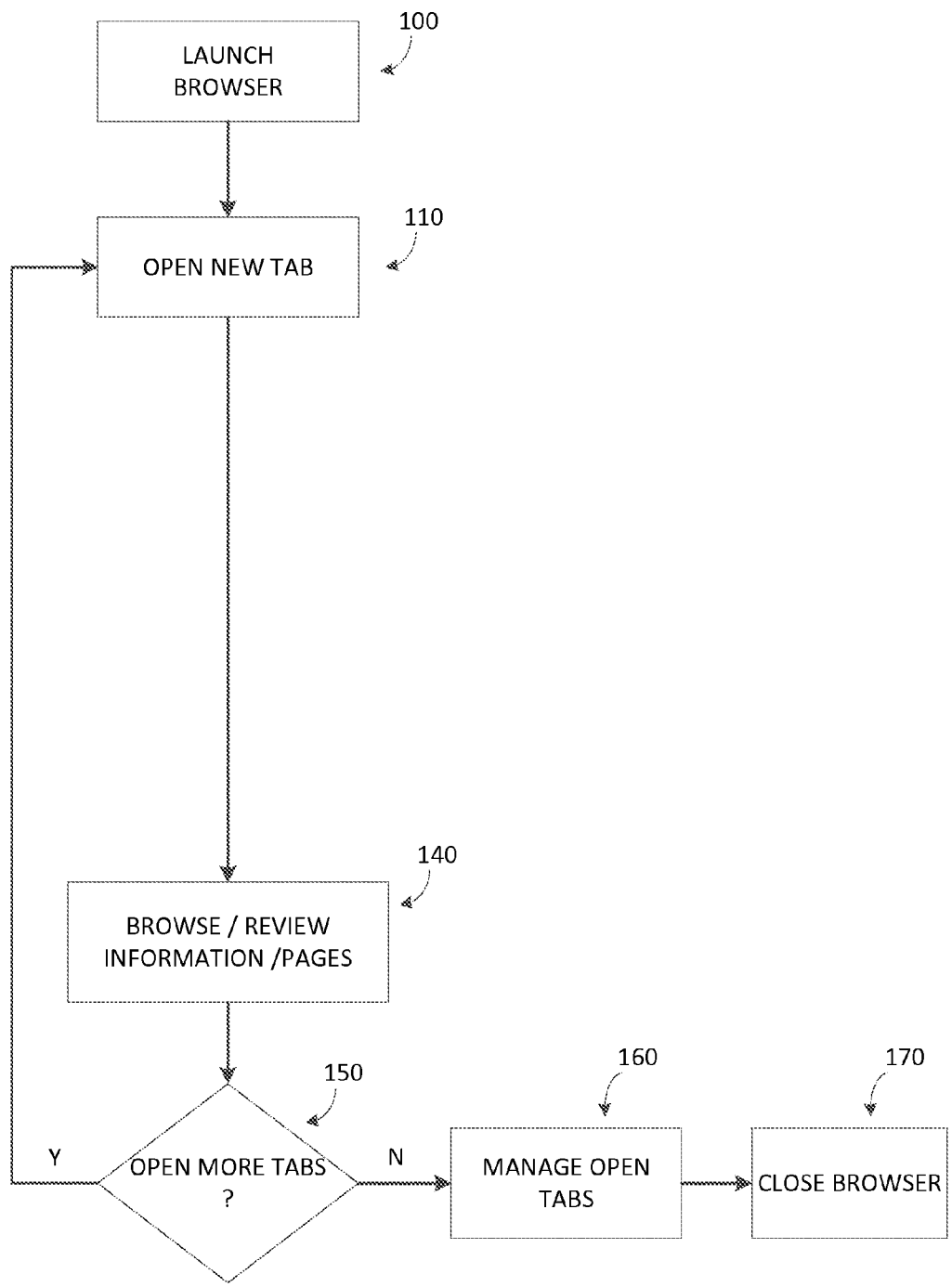
FIG. 1 is an exemplary flowchart of a process for opening and managing multiple tabs of online content.

When a user wishes to retrieve information from the world-wide-web, he or she may launch a web browser. A web browser is a software application that acts as a client of one or more servers, and that works in conjunction with those servers to provide online content to the user. A typical user's web-browsing experience in accordance with one or more aspects of the current invention is illustrated in FIG. 1.

Upon launching (100), the user's web browser typically displays one or more home pages. When more than one home page is displayed, each page can be displayed in its own tab within the browser. A user who is interested in online content that is not available on his or her home page(s), may launch or open (110) a new tab. In the course of browsing online content that is displayed in one or more tabs (140), the user may open and browse additional tabs as discussed above (150). As more and more tabs are opened, the need for effective tab management increases. In conventional browsers, new tabs always open to the right of existing tabs, and can only be moved to different locations by the user. The disclosed browser, however, can access information useful to actively managing open tabs (160). Eventually, the web browser can be closed (170).

As online content is received and presented to the user, and as the user interacts with the content, metadata associated with the user's interaction or activity with the content (known as "activity metadata" or "extrinsic metadata") can be generated and associated with the online content. Activity metadata may be compared and contrasted with metadata associated with the online content itself (known as "intrinsic metadata" or "content metadata"). Examples of intrinsic metadata include the web page's title, subject, and section headings, which provide a direct representation of the web page's topic and domain. Within the web page, the author may include as tags his name, company, keywords, and an expiry date for reference purposes, all of which are not immediately visible to the user. These metadata fields are also typically created by the author(s) of the web page and can be considered manually determined metadata. Other intrinsic metadata that generally is not defined by tags within the code for the page include the location at which the web page is stored and can be retrieved from (e.g., a uniform resource locator (URL) if the page is located on the Internet), the size of the web page (i.e., as measured in bytes, paragraphs, viewable pages, etc), security information, a number of images, and a number of links.

User activity metadata, on the other hand, can be generated based on the user's association or activity with the online content. For example, when a user retrieves a web page from the Internet for viewing, a history of the usage of that web page can be maintained by the browser, and the history of usage can be used to generate activity metadata. For example, activity metadata concerning the amount of scrolling within a web page, the number of times the user clicks on links in the web page, and the amount of information entered by the user into the web page, the number of times the web page has been accessed, and the date and time of the last access can be generated automatically as the user interacts with the online content.

Thus, metadata can be categorized as intrinsic metadata that exists at the time of the web page's creation, i.e., intrinsic metadata that belongs to part of the web page implicitly, or as extrinsic metadata that is generated as a result of the user's activity and interactions with of the content and potential local modifications and additions to the content. Some examples of intrinsic metadata include the web page's title, author, category, and the company name, keywords associated with the page (e.g., as metadata tags), the expiry date of the page, the URL at which the page is stored, the size of the page, the number of images in the page, and the number of links in the page. Some examples of extrinsic or activity metadata include the user-generated comments or highlighting on the web page, the number of times the page has been accessed by the user, the date and time of last access to the page by the user, the location at which the user accessed the page (e.g., if the page is accessed through a portable device that includes a location-identifying service, such as a global positioning services, then the user's location during access to online content can be identified; alternatively the IP address from which the user accesses the content can identify the user's location), the number of local revisions to the page, the number of times the user has clicked on the page, the amount of scrolling through the page performed by the user, and the amount of text entered into the page (e.g., when filling out a web-based form).

The intrinsic metadata usually are static elements, and generally do not change unless the author specifically modifies the web page to create a new version of the page. Correspondingly, extrinsic or activity metadata generally are dynamic elements, are personal to a user, and change as the web page is used and updated locally by a user.

The activity metadata about the user's activity or interaction with online content can provide information about the value of the online content to the user. For example, the number of times a web page is viewed or opened can provide a valuable indicator of the webpage's importance to a user, e.g., indicating that the web page is a perceived authority on some topic, or is a highly reliable source of information for the user. However, if the time spent on a page is usually very brief, then the web page may be only a link to a more useful page. The metadata monitor can generate this metadata about the number of times content is viewed and the duration of interaction with the content for later use.

Figure 2:
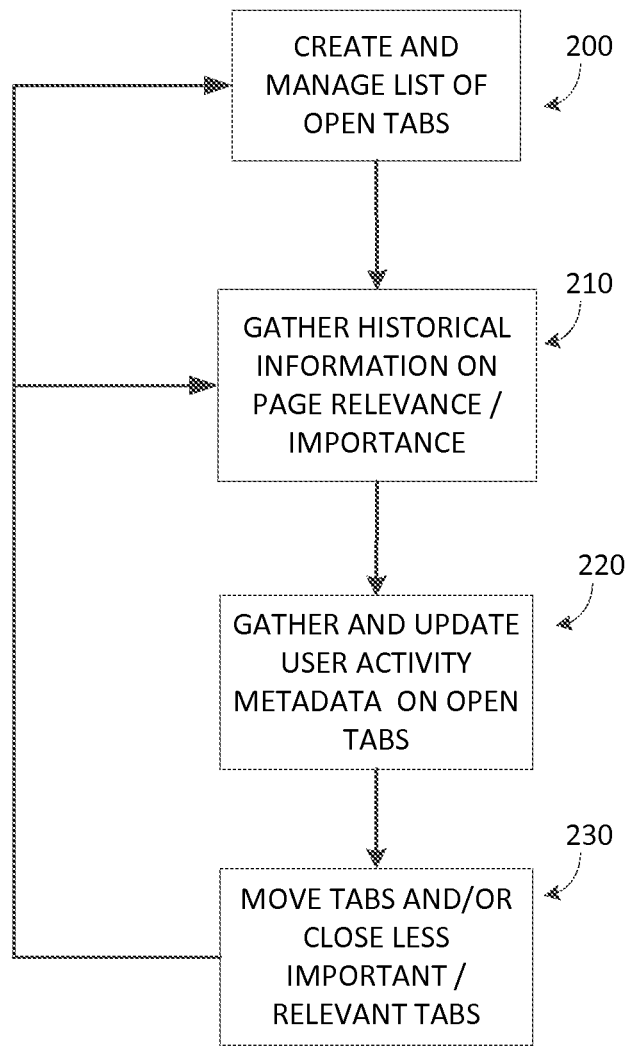
FIG. 2 is an exemplary flowchart of a process for managing multiple tabs of online content.

FIG. 2 is a flow chart showing a method by which a web-browser can manage a plurality of open document tabs. The browser can create (200) a list of open tabs, and update the list when a new tab is opened or when an existing open tab is closed. When a new tab is opened, the browser can obtain user activity metadata about the relative utility or importance to the user of the online content displayed in the tab. Information about the relative importance of particular online content in a tab can be generated from or based on data in the browser's cache, data about the user's recent browsing history, data about the online content that is listed in the user's bookmarks or favorites folders, or from a global repository or search engine that ranks pages on the web. For example, if the user has previously bookmarked a particular webpage of online content, that fact may provide an indication of the page's importance to the user. Moreover, the relative position of a bookmark to the page of online content in the hierarchy of bookmarks can indicate its importance. For example, bookmarks stored near the top of a list of bookmarks may be deemed to point to online content that is relatively more important to a user than online content indicated by a bookmark stored near the bottom of a list of bookmarks.

The frequency with which the user has accessed a page of online content, the amount of time a user spends viewing a page of content, the amount of scrolling within a page of content, and the number of links clicked within a page of content each provide additional user activity metadata that can indicate the relative importance of the online content. For example, pages that are accessed frequently, that are viewed for a long time, that are scrolled through extensively, and whose internal links are selected often can be deemed to be relatively more important to the user than pages that are not often accessed, that are viewed only briefly, that are scrolled through sparingly, and whose internal links are infrequently selected. Similarly, the fact that a user has setup a personal account at or through a page of online content, and has asked the browser to remember the account settings, such as user name and password or billing information can indicate that the online content at or linked from the page is relatively important to the user. In general, the user activity metadata generated and/or gathered by the browser allows the browser to identify (210) those pages that the user has recently visited or identified as important or favorite pages, or that have objectively been identified as important pages by a third party such as a search engine.

In addition to user activity metadata based on the user's historical interactions with the online content, the browser can create and maintain statistics (220) on all currently open tabs. For example, the browser can record the frequency with which each page is viewed, the amount of time spent viewing each page, the number of links followed from each page, and how long ago each page was viewed. Other statistical information useful in determining the importance of a page to a user includes how long a page is in an active tab state or "has focus" compared to other tags, whether the user sends the page or a link to the page to a contact or acquaintance, whether the user copies information from the page to the clipboard, whether the user prints out the page or information from the page, whether the user shares information with the page with another person, whether the user scrolls through the entire contents of the page, whether the user uploads a file to the page, whether the user saves the page to a local or online storage medium different from the medium from which the page is served, whether the user views the source code of the page, where the user manually re-positions the tabbed page within (e.g., pages moved to the leftmost tab position in a browser can be deemed to be relatively important to the user), the amount of time a user spends entering text or information into a page or otherwise interacts with the page, and the willingness of a user to frequently visit a slowly loading page.

Intrinsic metadata (also known as content metadata) also can be used to determine the relevance of particular content in a tab to a user. For example, various measures of global relevance of the content can be used as a proxy for measuring the importance of the content to an average online user (as opposed to a particular user). Thus, websites with very high traffic or with very high global relevance scores can be deemed to be relatively important to a user because they have been determined to be relatively important to an average Internet user. The scoring algorithm for pre-ranking the documents may be the same underlying relevance scoring algorithm used in the search system to generate a relevance score. In one embodiment, the relevance score can based on the page rank algorithm, as described in U.S. Pat. No. 6,285,999. Alternatively or additionally, statistics for a number of relevance score-relevant attributes of the content, such as the number of inlinks, outlinks, document length, may also be stored, and used alone or in combination in order to rank the content.

Intrinsic metadata may be useful for determining the importance of online content to a user the first time the user retrieves and loads the content and before the user interacts significantly with the content. Thus, the relative importance to a user of online content in a particular tab can be determined based on activity metadata, intrinsic metadata, or a combination of both activity metadata and intrinsic metadata.

In the above description, the active tab state can be defined as the state in which the tabbed page is the currently focused window, or the state in which the tabbed page is not obscured by any other window even if it is not the currently focused window. The length of time a page is in the active tab state can be modified to exclude periods where the screen saver is turned on. The types of information a user can share with a page that indicates the page's importance to the user can include email and home addresses, telephone numbers, billing or financial information, or information on other accounts that the user controls or has access to such as user names and passwords.

The browser can then use the historical and statistical user activity metadata it has collected to actively manage (230) the user's tabs. For example, the browser can reposition tabs based on their relative importance to the user and/or move tabbed pages that appear to be of relatively low current interest to the user to a position that indicates a low priority for the tabbed page (e.g., to the right-hand side of a tab bar of a browser window), can close them, or can display them as icons or thumbnails on the desktop or on a dashboard that appears at the bottom of the display. The browser can identify as pages of little current interest those pages that were viewed too long ago, too infrequently, too briefly, or based on some combination of these and other user activity metadata for the page as described above. If the browser decides to close a tabbed page that was viewed too infrequently or too long ago, it can do so automatically or after prompting a user to confirm the closure. Before closing a tabbed page, the browser can write the page's contents to non-volatile memory to free up system random access memory (RAM). Tabbed pages that have been written to non-volatile memory can be provided with a visual cue to indicate that they are no longer in system RAM. For example, the tabs of such pages can be colored differently (e.g., in red) to indicate they are no longer stored in RAM, or they can include a small insignia indicating they are no longer stored in RAM. After tabs have been moved and/or closed (230), the list of tabs can be updated (200) (e.g., if a tab has been closed or if a new tab has been opened) and/or information can continue to be gathered about the relevance or importance of the content in a tab to a user (210).

Figure 3:
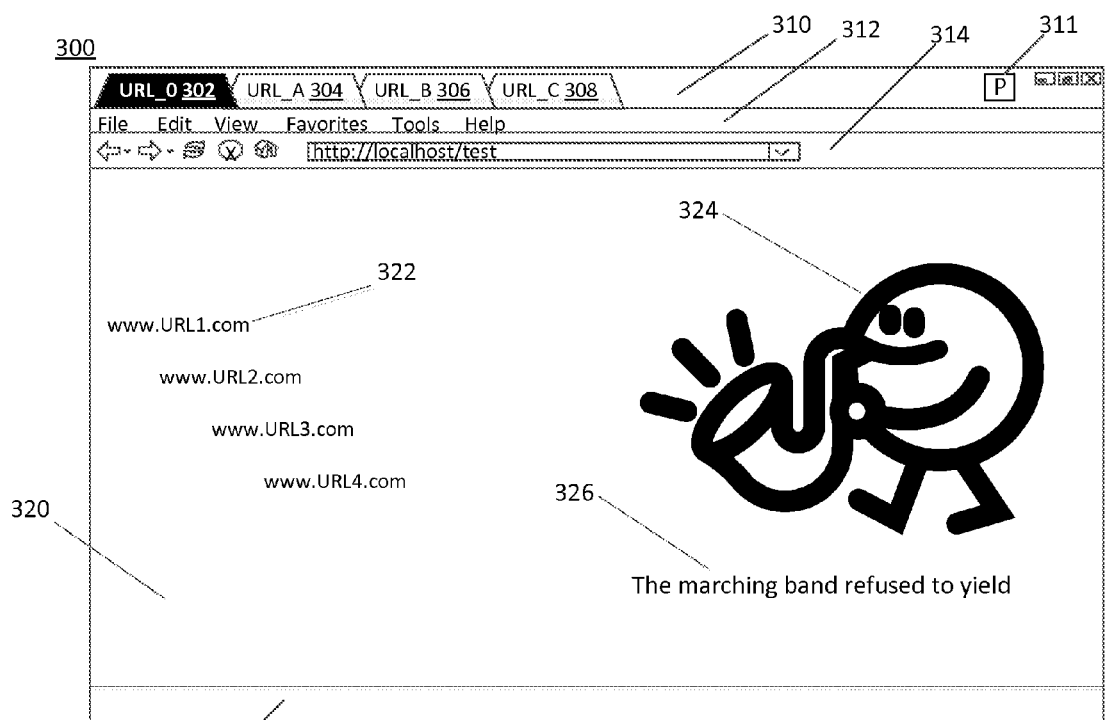
FIG. 3 is an exemplary graphical user interface ("GUI") for viewing and/or interacting with online content in one or more tabs of a window.

FIG. 3 is a block diagram of an example embodiment of a graphical user interface ("GUI") in accordance with the disclosed subject matter. In one embodiment, the GUI may include a window 300. In this illustrated embodiment the window 300 is a window of a web browser, but it is understood that any applications may be included. The window 300 may include a tab bar 310 for displaying tabs, a menu bar 312 for displaying drop down menu commands, an address bar 314 for displaying URL addresses and associated commands, and a dashboard 316 for docking tabs that have been opened to display online content but which are not displayed in the tab bar. As shown, the menu bar 310 can display a plurality of tabs 302, 304, 306, and 308, which contain the online content associated with URL_0, URL_A, URL_B, and URL_C, respectively. As shown, tab 302 is currently in the foreground and has "focus," and the handle of tab 302 is highlighted graphically to show this focus. The online content of the tab 302 that has focus can be displayed in an active window 320, through which the user may interact with the online content. The online content can include hyperlinks 322 to webpages of other online content, which may be opened, for example, in other tabs that can be displayed in the window 300, graphical content 324, and textual content 326.

In some implementations, the dashboard 316 can be a semi-transparent layer that is invisible to the user unless activated by clicking a special icon. The user can invoke the dashboard by moving the cursor into a pre-assigned hot corner, by pressing a hot key, or mouse button, any of which can be set to the user's preference. When the dashboard 316 is activated, the user's desktop can be dimmed and tabs on the dashboard can appear in the foreground, so that they can be selected for display in the tab bar 310 and their contents can be loaded into the active window of the browser.

As explained above, the position of the plurality of tabs 302, 304, 306, and 308 in the window 300 can be determined based, at least in part, on user activity metadata that is used to indicate the relative importance of the online content in each individual tab to the user. The determination of the relative importance of each tab 302, 304, 306, and 308 can be based on a plurality of factors, and which may be weighted differently or equally in different algorithms used to determine a relative importance to the user of each tab. For example, the tabs 302, 304, 306, and 308 can be positioned linearly on the tab bar 310 in order of their the relative importance to the user, with the tab of highest importance being placed to the left and tabs of lowest importance being placed to the left right. When all open tabs exceed a predetermined number, do not fit easily on the tab bar 310, or consume more than a predetermined amount, or percentage, of available system resources (e.g., CPU capacity or random access memory space) tabs of relatively low importance can be docked to the dashboard 316 or to the desktop (not shown). The online content of a tab that is deemed to be relatively unimportant to a user also can be written from volatile memory (e.g., RAM) to non-volatile memory (e.g., a hard disk) when the number of open tabs become large and managing the online content in all the open tab beings to burden the available system resources. Then, tabs that are deemed to be relatively unimportant to the user can be written from RAM to disk, so that the content of the remaining open tabs, which is stored in RAM, will be the content that is relatively more important to the user. As tabs are closed and/or as more system resources become available, the online content that had been written to disk can be restored to RAM.

The tabs 302, 304, 306, and 308 can be positioned according to their relative importance to the user either automatically without user input or at the initiative of the user. For example, tabs may be placed automatically in order of their relative importance to the user as they are opened. In another implementation, as the first few tabs are opened they may be opened sequentially to the right of the last-opened tab, and the automatic repositioning of tabs may not occur until a threshold number of tabs have been opened. The threshold number may be determined by a predetermined number of tabs. In another implementation, the threshold number may be a number of tabs that have a predetermined width in the tab bar 310 that occupy a predetermined width of the tab bar. Such an implementation may initiate repositioning of the tabs when the width of the tabs in the tab bar 310 becomes small such that it is difficult to read the title of the tabs in the tab bar. The user may control thresholds at which automatic repositioning of the tabs is initiated, for example, by adjusting one or more setting that control the display of the GUI 300 (e.g., by adjusting browser settings).

In another implementation, rather than, or in addition to, automatically repositioning the tabs without user input, the user may initiate the automatic repositioning of the tabs. For example, as tabs are opened they may be positioned to the right of the last opened tab, and then the user may select an icon 311 to reorder the tabs according to their relative importance to the user. In other implementations, the user may initiate the automatic reordering of the tabs through other actions, such as for example, by selecting a tab reordering tool from a drop down menu in the GUI or by right-clicking on a mouse to select a tab reordering tool, etc.

Figure 4:
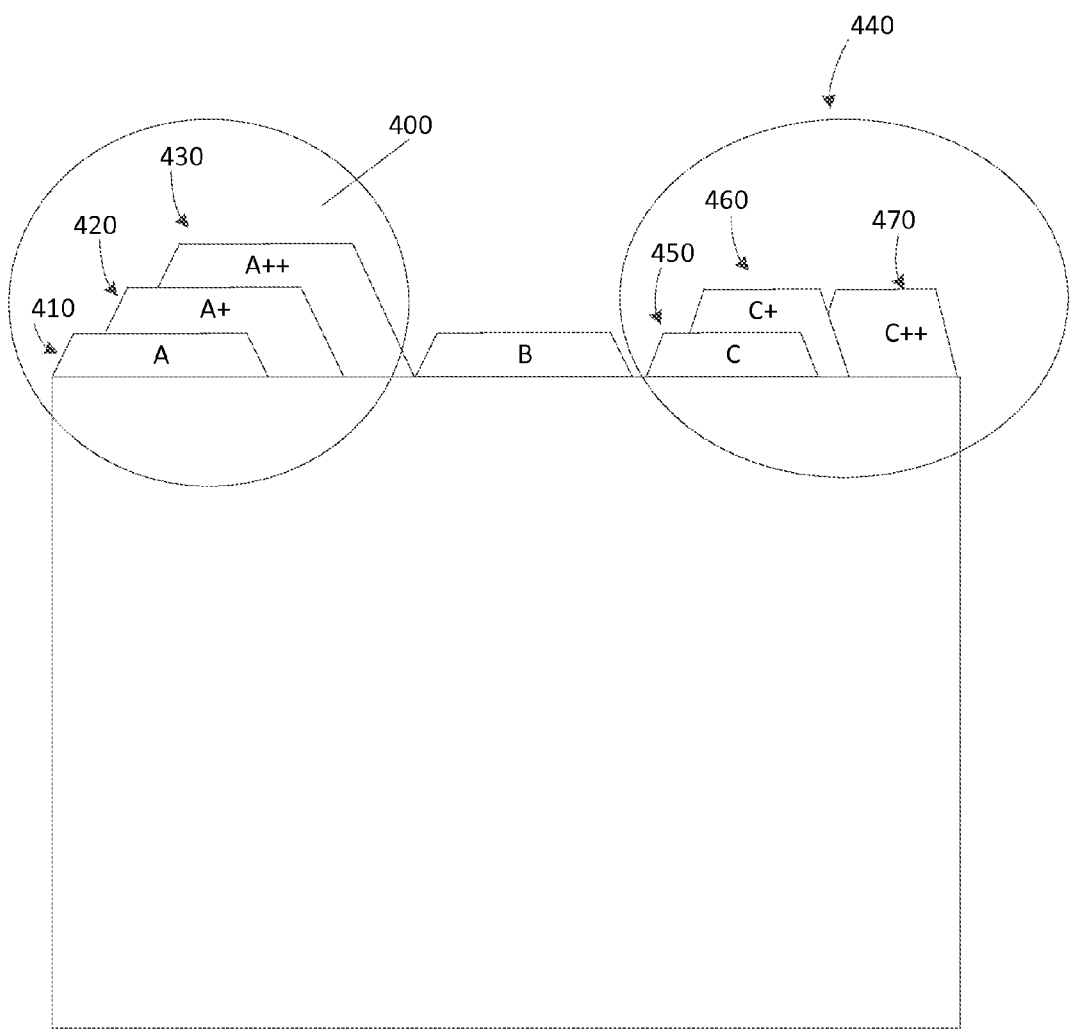
FIG. 4 is an exemplary GUI for viewing and/or interacting with online content in one or more tabs of a window.

In addition to moving, closing or storing infrequently used pages on a non-volatile memory device instead of in RAM, the tabbed browser can manage web pages by collating and organizing them to show their interrelatedness or interconnectedness. For example, as shown in FIG. 4, a user may open a web page in a tab 410, and subsequently follow hyperlinks from that page to open further pages that are opened in tabs 420 and 430. These pages may be displayed as a cluster 400 of tabs that is separate from tabs of other pages opened in the browser. The clustered tabs of web pages may be vertically stacked to show the order in which they were opened or the interrelationships between the pages. For example, in the cluster 400, the tab 420 is displayed directly behind the tab 410 to indicate that web page of tab 420 was opened from a link within the web page of tab 410. Similarly, the tab 430 is displayed directly behind the tab 420 to indicate that web page of tab 430 was opened from a link within the web page of tab 420. By contrast, in the cluster 440, the tabs 460 and 470 appear at the same hierarchical level behind the tab 450 to indicate that the web pages associated with both 460 and 470 were opened from links within page of tab 450. Clusters 400 and 440 can be created to indicate not only pages that are related by cross-references as discussed above, but also to indicate pages that are related by page content. Thus, a cluster could be formed to delineate tabs of pages that are categorically similar to each other, e.g., that all contain online content from news sites, that all contain online content from sports sites, that all contain online content from banks and financial sites, that all contain online content from personal dating sites, and the like.

As discussed above, the browser can manage tabbed pages by docking them, or displaying them on the desktop or on a dashboard. When a tabbed page is docked or displayed on the desktop or dashboard, it will no longer appear alongside the other tabs in the browser window. Instead, the tab will appear in a dashboard at the bottom of the user's display, or in a list of open but infrequently used tabs that are docked to the side of the user's display. The browser can do these things because the operating system treats each tabbed page as a primary windowing element or a separate process that is created and managed by the operating system. As a result, tabbed pages can be decoupled from the browser in which they were created, and separately minimized, maximized, and moved about the screen. When a tabbed page is decoupled from the browser in which it was created, a new instance of the browser is created and the tabbed page is displayed as the only tab in that new browser instance. In addition to allowing decoupling, treating each tabbed page as a primary windowing element increases the overall robustness of the browser. For example, if one tabbed page hangs (e.g., because the server from which a document identified by a URI was requested is busy or down), the entire browser does not hang, and the other tabbed pages are still accessible. Additionally, computer malware and spyware can be localized and contained within each tabbed page, so they do not infect other tabbed pages.

Figure 5:
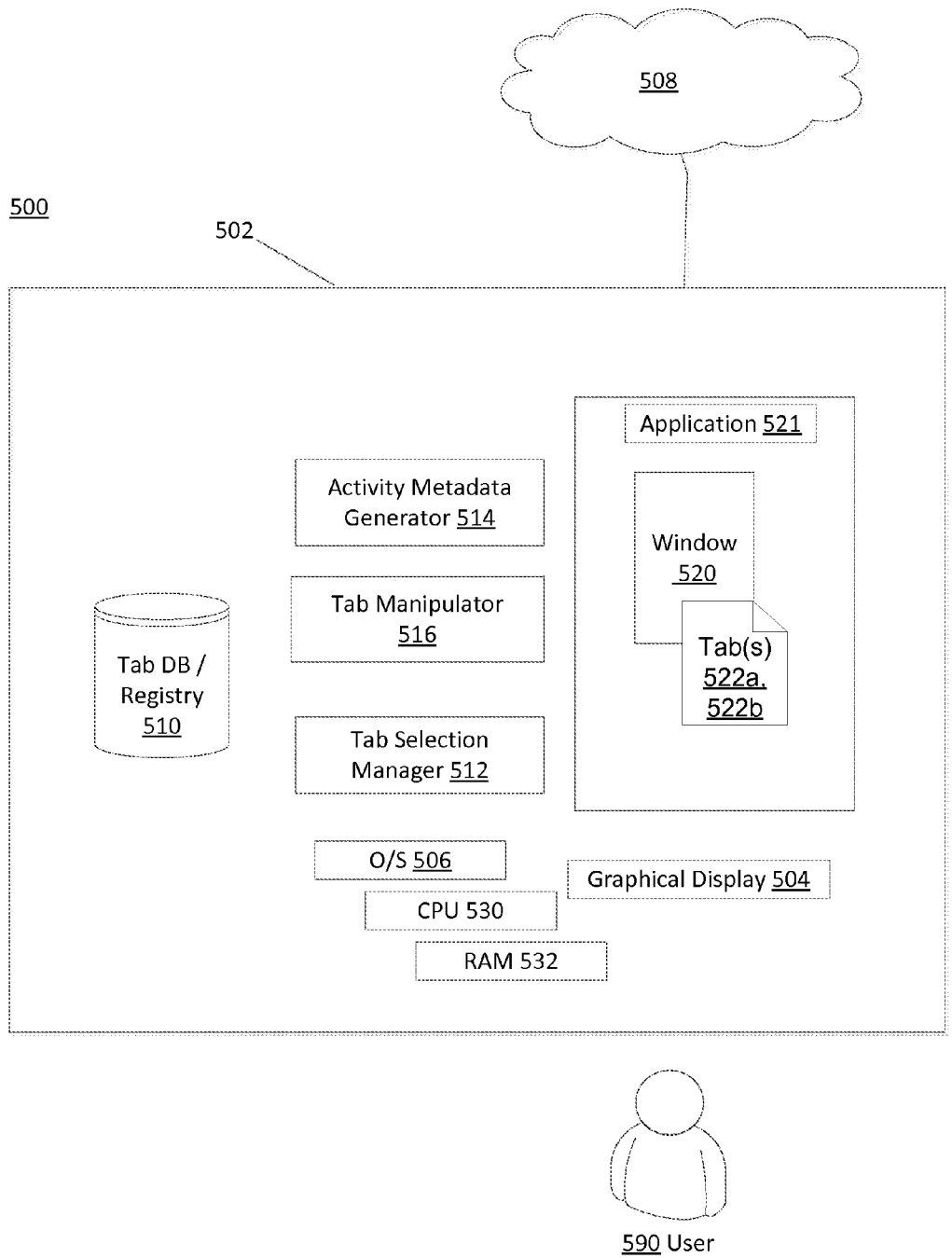
FIG. 5 is an exemplary block diagram of a system for managing multiple tabs of online content.

FIG. 5 is a block diagram of an example embodiment of a system 500 in accordance with the disclosed subject matter. In various embodiments, the system 500 may include a client computer or other computing device (e.g., smart-phone, etc.) 502 that executes an operating system 506, a window manager 502 and an application 521 or window 520. In one embodiment, the computer may include or be connected to a graphical display 504 (e.g., a monitor, touch-screen, etc.) and be controlled, at least in part, by a user 590.

In one embodiment, the user 590 may be running or causing the operating system 506 to execute an application 521 or window 520. For purposes of illustration the window 520 will be referred to as a web browser; although, it is understood that the above is merely one illustrative example to which the disclosed subject matter is not limited. In various embodiments, this window 520 may include a plurality of panes or tabs 522a, 522b. The client may receive online content from server computing devices (not shown) that may be connected to the client device 502 though a network 508. The online content can be processed and displayed on the graphical display 504 on a tab 522 of a window 520. The user can interact with the displayed content, and a user activity metadata generator 514 can monitor the user's interactions with the content and generate user activity metadata based on the user's interactions with the online content. The user activity metadata can be stored in database 510 in association with a reference (e.g., a URL) to the online content with which the user interacted to generate the metadata.

When a plurality of tabs 522a, 522b are opened in the window 520, a tab selection manager 512 may keep track of the tabs that are opened in the window, the relative importance to the user of the online content in each tab, and the system resources (e.g., use of the CPU 530 and RAM 532) used by the tabs. The tab selection manager 512 can rank the open tabs according to their relative importance to the user, which may be based at least in part on the user activity metadata associated with the online content in each tab. A tab manipulator 516 then can re-position, dock, write to disk, and close tabs 522a, 522b that are open in the window 520 based on the relative importance of the online content in the tabs.

The tab manipulator 516 also may be configured to organize the tabs 522, 522b into groups or clusters of tabs according to one or more criteria which may be determined or commanded by the tab selection manager 512. In turn, the groups or clusters of tabs then may be displayed in the organized representation of the tabs 522 to the user 590 via the display 504.

In one embodiment, the tab selection manager 516 may be configured to organize the representation of the tabs 522a, 522b according to a predetermined system or scheme of organization. For example, in one system of organization, tabs 522a and 522b may be sorted according to the time the tab was most recently accessed. In another embodiment, the tabs 522a and 522b may be grouped according to a functional definition associated with the tab (e.g., media player, document, commerce, etc.). Other systems of organization may include sorting by time created, grouping by Multipurpose Internet Mail Extensions ("MIME") type, grouping by window or other hierarchal UI element, most recently updated, least recently used, associated filename, directory, or universal resource locator (URL), memory or other system 500 resources used by the tabs, associated service provider (e.g., Netflix, Amazon, etc.), etc. It is understood that the above are merely a few illustrative examples to which the disclosed subject matter is not limited.

Figure 6:
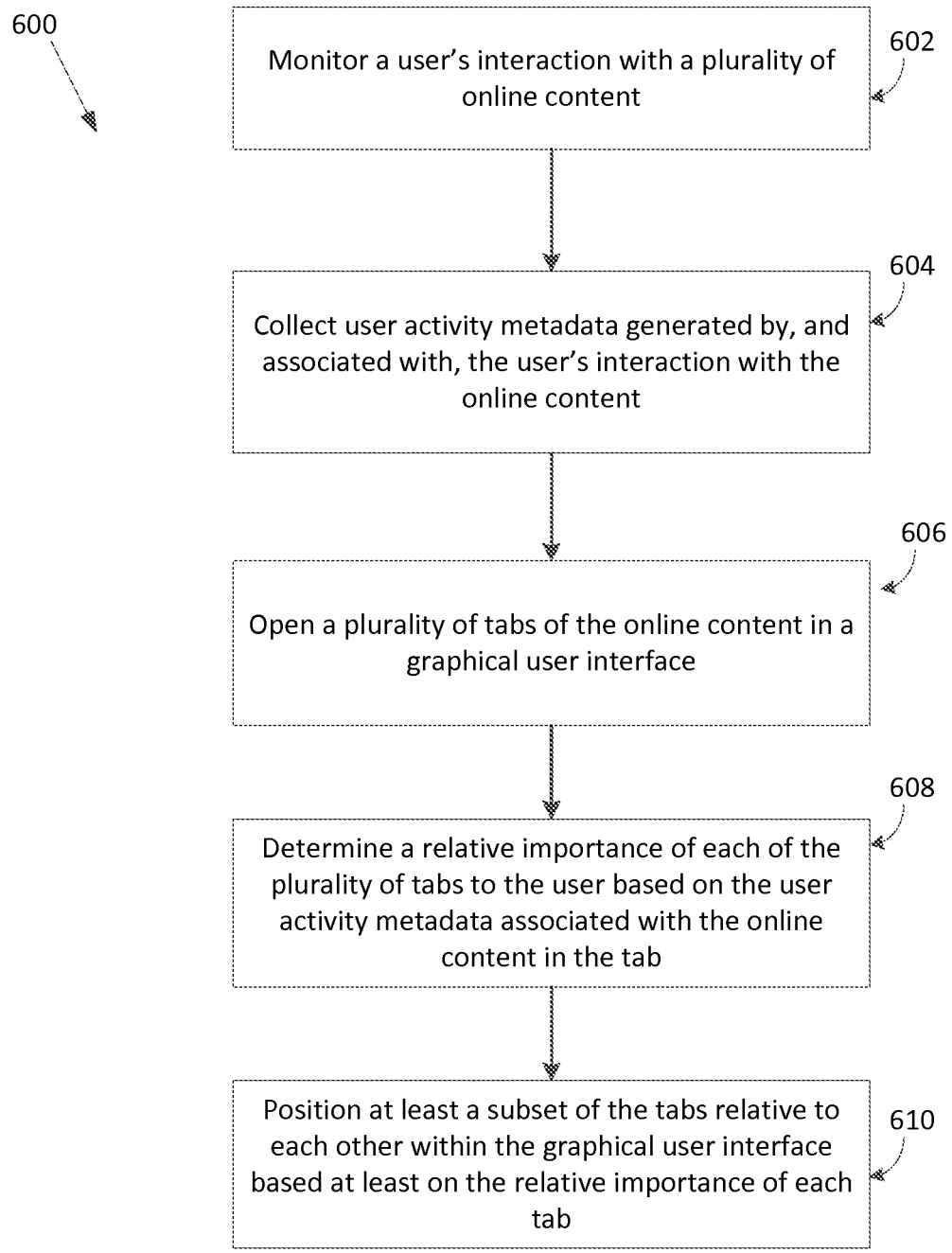
FIG. 6 is an exemplary flowchart of a process for managing multiple tabs of online content.

FIG. 6 is a flowchart of a process 600 of repositioning tabs in a graphical user interface. The process includes monitoring a user's interaction with a plurality of online content (602). For example, when online content is displayed to a user (e.g., in a browser), the interactions the content can be monitored. User activity metadata generated by, and associated with, the user's interaction with the online content is collected (604). For example, the activity metadata generator 514 can generate the user activity metadata based on the interactions of the user with the content. A plurality of tabs of the online content are opened in the graphical user interface (606). In some implementations, the user's actions with online content are monitored whenever the user interacts with online content, so that when the user opens online content in a tab user activity metadata already exists for the content of the tab. Also, after a tab is opened the user's interactions with the content of the tab also can be monitored and user activity metadata for the content of the tab can be further generated or supplemented based on the monitored interactions. Thus, the steps of process need not be performed in the order indicated in FIG. 6.

A relative importance of each of the plurality of open tabs to the user is determined based on the user activity metadata associated with the online content in the tab (608). The relative importance of each of the open tabs can be determined exclusively based on the user activity metadata or in conjunction with other criteria, such as, for example, intrinsic metadata associated with the content of the open tab. At least a subset of the tabs are positioned relative to each other within the graphical user interface based at least on the relative importance of each tab (610).

Figure 7:
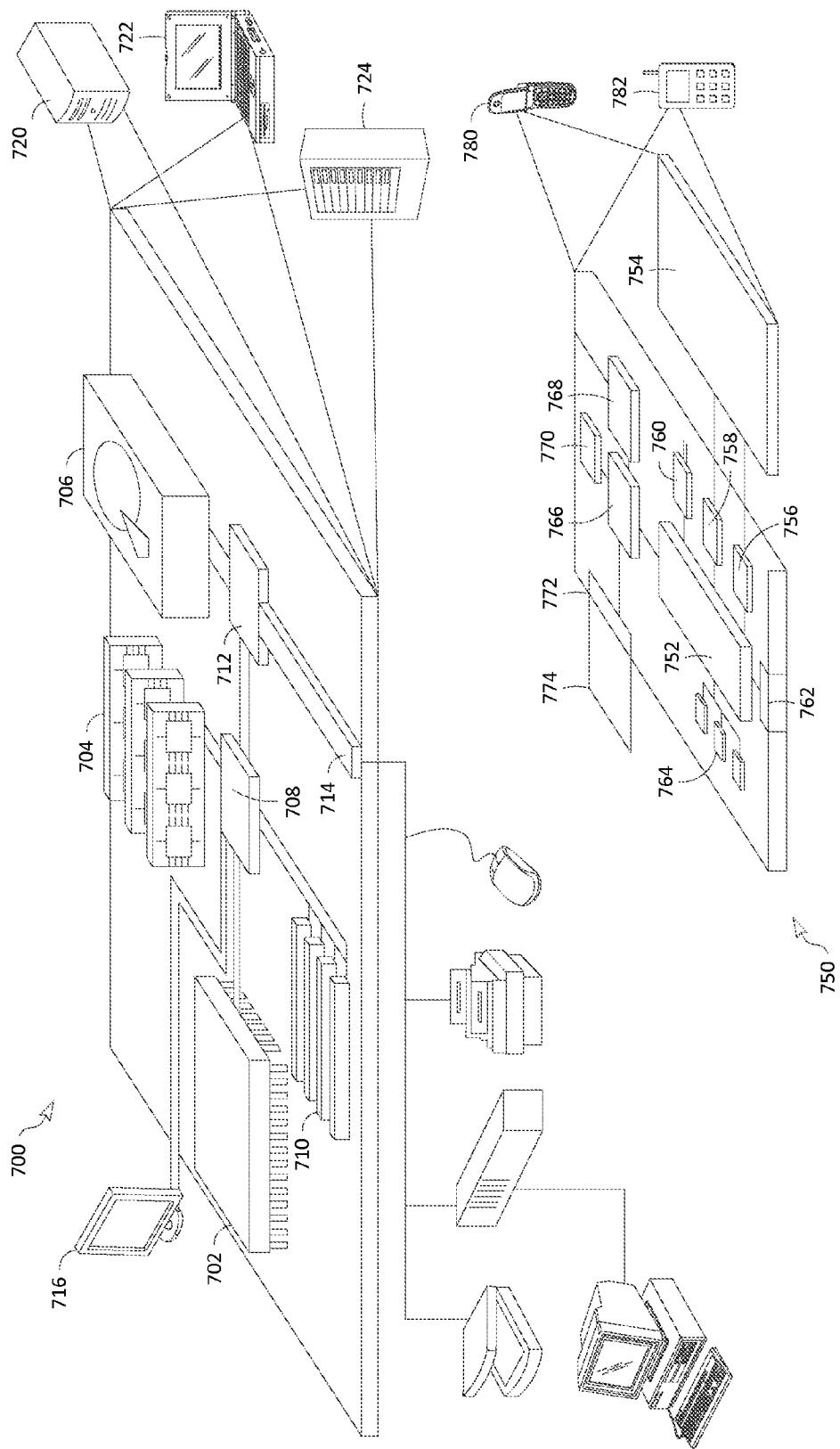
FIG. 7 is a schematic block diagram of one or more computing systems that may implement the techniques described herein.

FIG. 7 is a schematic block diagram of one or more computing systems that may implement the techniques described herein. Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system). Thus different processors 702, 752 and/or computing devices 700, 750 may individually or collaboratively perform the techniques described herein.

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A method comprising:
 collecting user activity metadata generated by, and associated with, a user's interaction with online content;
 opening a plurality of tabs of the online content in a graphical user interface of a window of a browser application;
 positioning the opened tabs in a first arrangement of tabs in the browser window;
 determining, through a processor of one or more computer systems, a relative importance of each of the plurality of opened tabs to the user based on the user activity metadata associated with the online content in each of the opened tabs;

receiving an indication of a selection of a graphical user interface element included in the browser window; and automatically, based on receipt of the indication of the selection and without requiring further input from the user:

determine a first subset of the opened tabs and a second subset of the opened tabs based at least on the relative importance of each of the plurality of opened tabs to the user, the second subset of the opened tabs determined as less important to the user than the first subset of the opened tabs;

re-position the first subset of the opened tabs relative to each other in a second arrangement of the opened tabs within the browser window of the graphical user interface without opening an additional tab, wherein the second arrangement is different from the first arrangement and wherein the re-positioning is based at least on the relative importance of each of the tabs included in the first subset of opened tabs; and dock the second subset of the opened tabs, wherein the docking decouples each of the opened tabs included in the second subset of opened tabs from the browser application, and wherein the docking removes each of the opened tabs included in the second subset of opened tabs from the browser window, each decoupled docked tab being a primary windowing element that when maximized is displayed in a new instance of the browser application.

2. The method of claim 1, wherein re-positioning the first subset of the opened tabs relative to each other within the browser window of the graphical user interface includes re-positioning at least the first subset of the opened tabs linearly along a tab bar within the browser window in an order based on the relative importance of the first subset of opened tabs.

3. The method of claim 1, wherein:
the graphical user interface includes a dashboard, and
docking the second subset of the opened tabs includes positioning each of the tabs included in the second subset of opened tabs on the dashboard.

4. The method of claim 1, further comprising, based on receipt of the indication of the selection:
determining that more than a predetermined number of tabs have been opened;
based on determining that more than a predetermined number of tabs have been opened, identifying a third subset of the opened tabs to be closed based on the relative unimportance of the opened tabs; and
closing the third subset of the opened tabs.

5. The method of claim 1, wherein the user activity metadata associated with particular online content comprises metadata about a number of times the user has viewed the particular online content in a time period.

6. The method of claim 1, wherein the user activity metadata associated with particular online content comprises data about a time that the user last interacted with the particular online content.

7. The method of claim 1, wherein the user activity metadata associated with particular online content comprises data about an amount of time the user viewed the particular online content.

8. The method of claim 1, wherein the user activity metadata associated with particular online content comprises data about whether the user has stored a bookmark for the particular online content.

9. The method of claim 1, wherein the user activity metadata associated with particular online content comprises data about whether the user has entered login information to access the particular online content.

10. The method of claim 1, wherein the graphical user interface element includes an icon displayed within the browser window.

11. The method of claim 1, wherein the graphical user interface element includes a tool displayed within a drop down menu of the graphical user interface.

12. The method of claim 1, further comprising, based on receipt of the indication of the selection:
determining that a tab included in the opened tabs is relatively unimportant; and
based on determining that the tab is relatively unimportant:
closing a web page associated with the relatively unimportant tab; and
before closing the web page, writing content included in the web page from volatile memory to non-volatile memory.

13. The method of claim 12, further comprising, based on determining that the tab is relatively unimportant:
receiving an indication to close the web page associated with the relatively unimportant tab before closing the web page.

14. A non-transitory computer program product tangibly embodied on a computer-readable storage medium having executable-instructions stored thereon, the instructions being executable to cause one or more computer systems to:
collect user activity metadata generated by, and associated with, a user's interaction with online content;
open a plurality of tabs of the online content in a graphical user interface of a window of a browser application;
position the opened tabs in a first arrangement of tabs in the browser window;
determine a relative importance of each of the plurality of opened tabs to the user based on the user activity metadata associated with the online content in each of the opened tabs;
receive an indication of a selection of a graphical user interface element included in the browser window; and
based on receipt of the indication of the selection and without requiring further input from the user:
determine a first subset of the opened tabs and a second subset of the opened tabs based at least on the relative importance of each of the plurality of opened tabs to the user, the second subset of the opened tabs determined as less important to the user than the first subset of the opened tabs;
automatically re-position the first subset of the opened tabs relative to each other in a second arrangement of tabs within the browser window of the graphical user interface without opening an additional tab, wherein the second arrangement is different from the first arrangement and where the re-arrangement is based at least on the relative importance of each of the tabs included in the first subset of opened tabs; and
automatically dock the second subset of the opened tabs, wherein the docking decouples each of the opened tabs included in the second subset of opened tabs from the browser application, and wherein the docking removes each of the opened tabs included in the second subset of opened tabs from the browser window, each decoupled docked tab being a primary windowing element that when maximized is displayed in a new instance of the browser application.

15. The non-transitory computer program product of claim 14, wherein automatically re-positioning the first subset of the opened tabs relative to each other within the browser window of the graphical user interface includes re-positioning at least the first subset of the opened tabs linearly along a tab bar within the browser window in an order based on the relative importance of the first subset of opened tabs.

16. The non-transitory computer program product of claim 14, wherein the graphical user interface includes a dashboard, and wherein automatically docking the second subset of the opened tabs and positioning each of the tabs included in the second subset of opened tabs on the dashboard.

17. The non-transitory computer program product of claim 14, the instructions being executable to further cause the one or more computer systems to:
   determine that more than a predetermined number of tabs have been opened;
   based on determining that more than a predetermined number of tabs have been opened, identify a third subset of the opened tabs to be docked to a desktop based on a relative unimportance of the opened tabs; and
   dock the third subset of the opened tabs to the desktop.

18. The non-transitory computer program product of claim 14, wherein the graphical user interface element includes an icon displayed within the browser window.

19. The non-transitory computer program product of claim 14, wherein the graphical user interface element includes a tool displayed within a drop down menu of the graphical user interface.

20. The non-transitory computer program product of claim 14, the instructions being executable to further cause the one or more computer systems to:
   determine that a tab included in the opened tabs is relatively unimportant; and
   based on determining that the tab is relatively unimportant:
      close a web page associated with the relatively unimportant tab; and
      before closing the web page, write content included in the web page from volatile memory to non-volatile memory.

21. The non-transitory computer program product of claim 20, the instructions being executable to further cause the one or more computer systems to, based on determining that the tab is relatively unimportant, receive an indication to close the web page associated with the relatively unimportant tab before closing the web page.

22. The non-transitory computer program product of claim 14, wherein the user activity metadata associated with particular online content comprises metadata about a number of times the user has viewed the particular online content in a time period.

23. The non-transitory computer program product of claim 14, wherein the user activity metadata associated with particular online content comprises data about a time that the user last interacted with the particular online content.

24. The non-transitory computer program product of claim 14, wherein the user activity metadata associated with particular online content comprises data about an amount of time the user viewed the particular online content.

25. The non-transitory computer program product of claim 14, wherein the user activity metadata associated with particular online content comprises data about whether the user has stored a bookmark for the particular online content.

26. The non-transitory computer program product of claim 14, wherein the user activity metadata associated with particular online content comprises data about whether the user has entered login information to access the particular online content.

* * * * *

UNITED STATES PATENT AND TRADEMARK OFFICE
CERTIFICATE OF CORRECTION

| | | |
|---|---|---|
| PATENT NO. | : 9,110,568 B2 | Page 1 of 1 |
| APPLICATION NO. | : 13/246646 | |
| DATED | : August 18, 2015 | |
| INVENTOR(S) | : John Nicholas Jitkoff et al. | |

It is certified that error appears in the above-identified patent and that said Letters Patent is hereby corrected as shown below:

On the title page, item 56, in column 2, under "Other Publications", line 2, delete "retreived" and insert -- retrieved --, therefor.

Signed and Sealed this
Fifth Day of January, 2016

Michelle K. Lee
*Director of the United States Patent and Trademark Office*